No. 870,015. PATENTED NOV. 5, 1907.
J. C. COOK & E. SOKAL.
STORAGE BATTERY.
APPLICATION FILED MAY 10, 1905.

2 SHEETS—SHEET 1.

Witnesses:
Louis W. Gratz.
May E. McArthur.

Joseph C. Cook
Edward Sokal } Inventors
by Geyer & Popp
Attorneys

No. 870,015. PATENTED NOV. 5, 1907.
J. C. COOK & E. SOKAL.
STORAGE BATTERY.
APPLICATION FILED MAY 10, 1905.

2 SHEETS—SHEET 2.

Witnesses.
Louis W. Gratz.
Mary E. McArthur

Joseph C. Cook
Edward Sokal } Inventors
by Geyer & Popp
Attorneys.

UNITED STATES PATENT OFFICE.

JOSEPH C. COOK AND EDWARD SOKAL, OF BUFFALO, NEW YORK; SAID SOKAL ASSIGNOR TO SAID COOK.

STORAGE BATTERY.

No. 870,015.　　　Specification of Letters Patent.　　　Patented Nov. 5, 1907.

Application filed May 10, 1905. Serial No. 259,710.

*To all whom it may concern:*

Be it known that we, JOSEPH C. COOK, a citizen of the United States, and EDWARD SOKAL, a subject of the Emperor of Austria-Hungary, both residing at Buffalo, in the county of Erie and State of New York, have invented a new and useful Improvement in Storage Batteries, of which the following is a specification.

This invention relates to the plates of storage batteries and their formation.

The principal object of our invention is the production of a plate of this character which is specially adapted to a compound or mixed formation embodying the well-known Planté and Faure processes, thus combining the advantages of both of those types of plates while avoiding the disadvantages peculiar to each.

A further object is to produce a stable battery plate which affords a maximum contact surface of the active material for a given weight of lead, which permits a rapid circulation and a thorough distribution of the electrolyte and which is comparatively light in proportion to its capacity.

To these ends the invention consists of the improvement in the construction of the plate and the method of forming the same, hereinafter described and pointed out in the claims.

Figure 1:
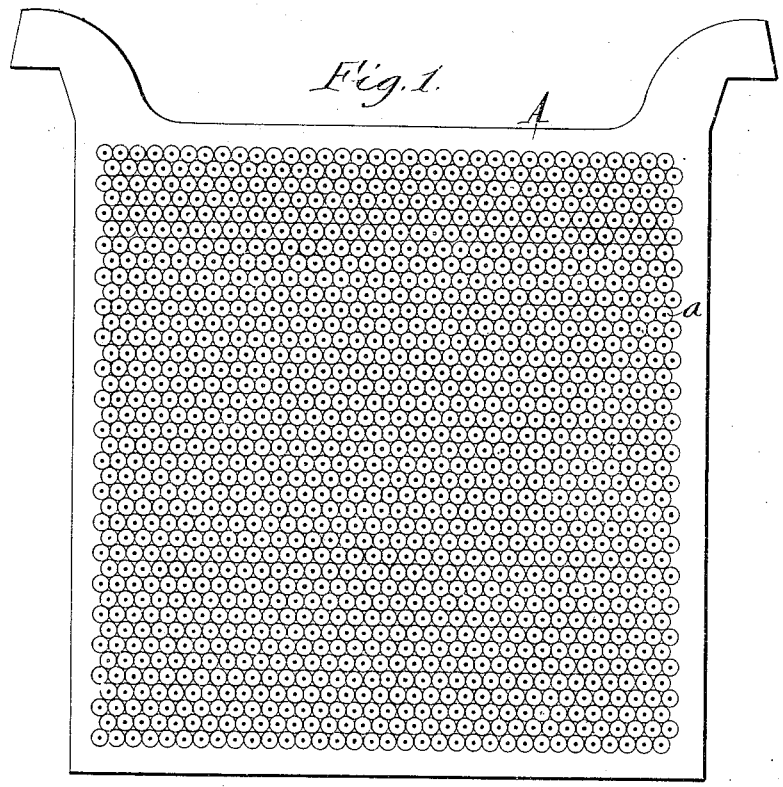
Figure 2:
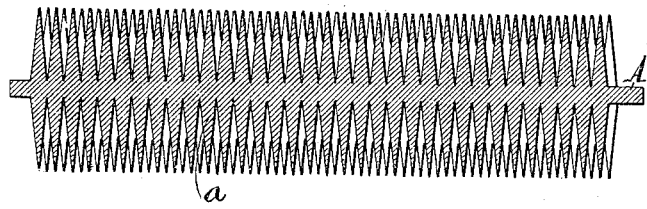
Figure 3:
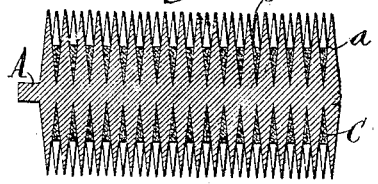
Figure 4:
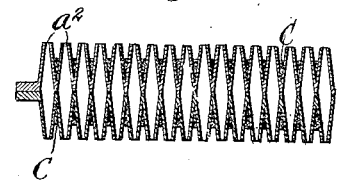
Figure 5:
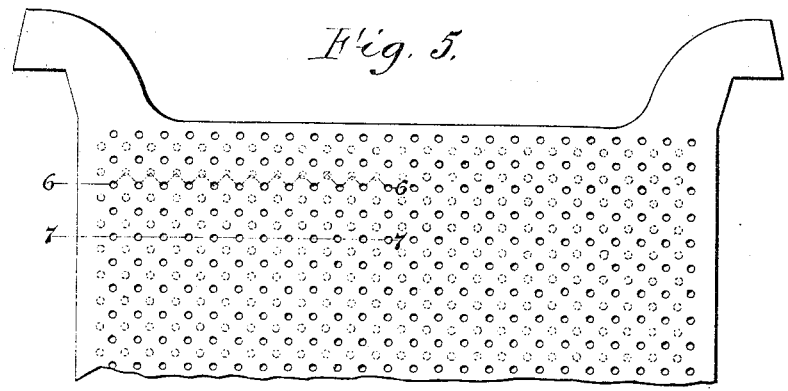
Figure 6:
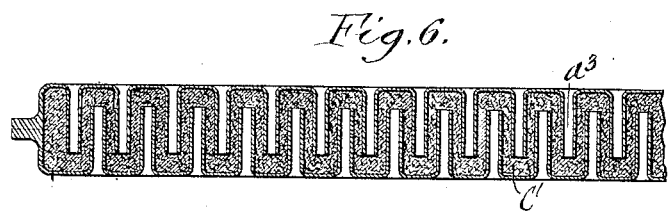
Figure 7:
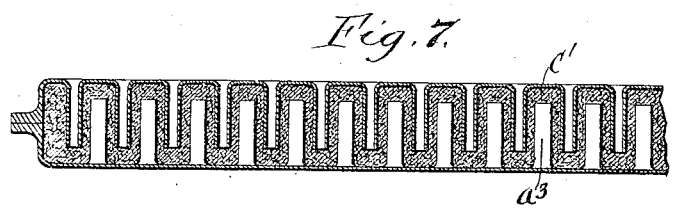
Figure 8:
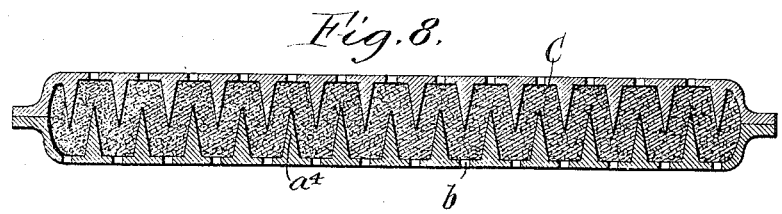

In the accompanying drawings: Figure 1 is a face view of one form of battery plate embodying our invention, the pasted active material being omitted. Fig. 2 is an enlarged transverse section thereof. Fig. 3 is a similar section, showing the active material applied to the plate. Fig. 4 is a fragmentary horizontal section of another form of the plate. Fig. 5 is a face view of an envelop embodying the invention. Figs. 6 and 7 are horizontal sections in lines 6—6 and 7—7, Fig. 5. Fig. 8 is a horizontal section of still another modification of the plate.

Similar letters of reference indicate corresponding parts throughout the several views.

Referring to the construction shown in Figs. 1, 2 and 3, A is a lead plate or grid provided with numerous closely-arranged spurs, pins or projections *a* which practically cover its entire area, giving the same a brush-like surface. The plate may have such projections on one side only, or on both sides, as shown in Figs. 1, 2 and 3. The shape or cross section of the projections is immaterial. Those illustrated in the last-named figures are spur-like or conical, but if desired they may be cylindrical, polygonal or pyramidal, or cylindrical with a conical or pyramidal end. Their bases are preferably enlarged to form a stronger and more efficient connection between them and the lead plate. The projections may be solid, as shown in Figs. 1, 2 and 3, or hollow or tubular, as shown at $a^2$ in Fig. 4, the latter construction increasing the available contact area or surface of the plate and also reducing its weight. The projections may be of any suitable length, satisfactory results having been obtained by making them about half an inch long. When the plates have solid projections, they may be cast under pressure by any well-known method. Plates with hollow or tubular projections are preferably cast under hydraulic pressure, the lead being forced by a piston through holes of suitable form, in the center of which dies or core-pins are supported in any well-known or suitable manner. Plates of this description permit of a novel and desirable method of formation which is peculiarly adapted to this style of grid and by which the stability, durability and other advantages of the Planté plate are combined with the rapid formation of the Faure system, while at the same time avoiding the undesirable oxidizing or other lead-attacking agents employed in the rapid-formation plates now commonly used, mere traces of which when remaining on the plates cause a rapid growth of the positive plate and a rapid deterioration or disintegration of both electrodes in service.

Our invention consists in applying to the plate, preferably around the base portions of the spurs or equivalent projections, a paste C such for instance as is used in ordinary pasted plates, then forming the paste according to the well-known Faure process and finally subjecting the large superficial area of lead produced by the exposed portions of the projections to the Planté action, in service.

The layer of paste should be of sufficient thickness to give the plate a suitable capacity. A considerable portion of the projections extends into the electrolyte, and by charging and discharging in clear diluted sulfuric acid or other suitable electrolyte, the same are formed according to the Planté process without any unusual expenditure or loss of time or current and without the use or addition of nitrates, chlorates, perchlorates and other substances which accelerate the formation of the plates but cannot be completely removed and therefore cause rapid disintegration of the plate. Combined with the original Faure plate, we thus obtain, at an ordinary cost and in a comparatively short time, an electro-chemically formed Planté plate having all of the advantages peculiar to the latter type. Moreover, this improved plate, while combining the advantages of these well-known types of plates, is not liable to warp or buckle in service and the paste or active material is reliably held in intimate contact with the plate. It is well understood by those skilled in the art that when the use of such oxidixing or other lead-attacking agents is avoided, there is a more intimate connection between the grid and the active material and the two expand and contract more uniformly, rendering the active material less liable to loosen and become detached from the grid.

The brush-like surface of the plate affords a very large contact area and permits a free circulation and uniform distribution of the electrolyte, and it also forms a simple means of holding the active material or material to become active, in efficient mechanical and electrical contact with the grid.

The improvement is also applicable to a plate or electrode in the form of an envelop, as shown in Figs. 5, 6 and 7. In this case, the envelop may be constructed of a doubled plate having inwardly-extending tubular pins or projections $a^3$, the bores of which extend through the plate, so as to form passages for the circulation of the electrolyte through the envelop; or if desired, the envelop may consist of two separate dished plates having such projecting spurs or tubes on their inner sides, as shown in Fig. 8. In the last-mentioned modification the envelop has solid spurs or projections $a^4$ and its walls are provided at intervals with perforations $b$ for the circulation of the electrolyte. The meeting edges of the envelop are united autogenously, or by any other suitable means.

In constructing plates of the envelop type, such as shown in Figs. 5—8, the paste is simply placed within the same, as shown at $C^1$. When tubular projections are employed, the paste may be placed within the tubes but it is preferably placed around them, in which case the interior of the tubes as well as their projecting portions are exposed to the Planté action. The construction shown in the last-named figures affords the important advantage that it overcomes the objectionable consequences of buckling or warping, inasmuch as the growth of the active material on a positive plate of this kind results in producing a better contact between the active material and the grid. It is obvious that a similar result would be obtained if the pasted active material were inclosed by a lead envelop making good electrical and mechanical contact with the grid and the envelop were provided with a sufficient number of cylindrical or other perforations approximating the size and depth of the tubular projections hereinbefore described.

The plates shown in Figs. 1—4 are especially adapted for use in a horizontal position, in which case the positive plates preferably have spurs or projections on their upper side only. By this arrangement, the active material which becomes detached from the upper part of a positive or a negative plate remains in contact with the same; no active material can drop from the positive to the negative plate and any active material which may drop from the lower part of a negative upon the positive plate immediately below it is readily peroxidized and becomes a part of the latter. Negative plates are preferably provided with projections on both sides. We preferably give the plate several charges and discharges before applying the paste, to promote the adhesion of the latter to the grid.

While we prefer the constructions of the plates herein shown for obtaining a large superficial area of lead adapted to be subjected to the Planté action, we do not wish to be limited to those particular constructions as the plate can be widely modified without departing from the essence of the invention.

We are aware that plates of the Faure type employing a lead or lead-alloy grid have parts which are exposed to Planté action in service, a greater or less peroxidation taking place on the positive and formation of sponge-lead on the negative; but the grids of such plates are designed solely as carriers or supports for the paste or active material, and the exposed portion thereof is minimal and its capacity negligible. In our improved plate, its numerous closely-arranged projections produce a relatively large area or surface for exposure to the Planté action in service, giving the plate a comparatively large capacity after the paste has fallen off.

We claim as our invention:

1. A combination Faure and Planté battery plate having a paste or mass adapted to be formed according to the Faure process and a relatively large superficial area of lead adapted to be exposed to the Planté action in service, substantially as set forth.

2. A storage battery plate having a paste of active material adapted to be formed according to the Faure process and numerous closely-arranged pin-like projections forming a relatively large area of lead adapted to be exposed to the Planté action in service, substantially as set forth.

3. A storage battery plate having a paste of active material adapted to be formed according to the Faure process and numerous closely-arranged tubular projections forming a relatively large area of lead adapted to be exposed to the Planté action in service, substantially as set forth.

4. A storage battery plate having numerous closely-arranged tubular projections forming a relatively large area of lead adapted to be exposed to the Planté action in service, and a paste of active material arranged around the projections and adapted to be formed according to the Faure process, substantially as set forth.

5. A storage battery plate having numerous closely-arranged pin-like projections forming a relatively large lead area adapted to be exposed to the Planté action in service and a paste of active material applied to the base portions of the projections, leaving their remaining portions exposed to the Planté action, said paste adapted to be formed according to the Faure process, substantially as set forth.

6. The herein described method of producing a combination Faure and Planté battery plate, which consists in providing the plate with a relatively large superficial area of lead and applying to the plate a paste or material designed to become active, then forming the plate according to the Faure process and finally exposing the superficial lead area to the Planté action in service, substantially as set forth.

7. The herein described method of producing a combination Planté and Faure battery plate, which consists in constructing a lead plate with numerous closely-arranged tubular projections forming a relatively large area, applying a paste or material designed to become active to the plate, then forming the plate according to the Faure process and finally subjecting the projections to the Planté action in service, substantially as set forth.

Witness our hands this 6th day of May, 1905.

JOSEPH C. COOK.
EDWARD SOKAL.

Witnesses:
C. F. GEYER,
E. M. GRAHAM.